US012766518B2

(12) United States Patent
Lee et al.

(10) Patent No.: US 12,766,518 B2
(45) Date of Patent: Oct. 20, 2026

(54) EXPERIMENTATION TABLE INTEGRATED WITH HARMFUL GAS REDUCTION AND AIR PURIFICATION SYSTEM

(71) Applicant: AQA CO., LTD., Ansan-si (KR)

(72) Inventors: Yong Koo Lee, Siheung-si (KR); Jae Hoon Lee, Siheung-si (KR); Sang Jun Park, Ansan-si (KR)

(73) Assignee: AQA CO., LTD., Ansan-si (KR)

( * ) Notice: Subject to any disclaimer, the term of this patent is extended or adjusted under 35 U.S.C. 154(b) by 379 days.

(21) Appl. No.: 18/519,404

(22) Filed: Nov. 27, 2023

(65) Prior Publication Data

US 2025/0135460 A1 May 1, 2025

(30) Foreign Application Priority Data

Oct. 26, 2023 (KR) ........................ 10-2023-0144983

(51) Int. Cl.
*B01L 9/02* (2006.01)
*B01D 53/74* (2006.01)

(52) U.S. Cl.
CPC ................ *B01L 9/02* (2013.01); *B01D 53/74* (2013.01); *B01L 2200/0684* (2013.01); *B01L 2200/082* (2013.01); *B01L 2300/027* (2013.01); *B01L 2300/0681* (2013.01)

(58) Field of Classification Search
CPC ............... B01L 9/02; B01L 2200/0684; B01L 2200/082; B01L 2300/027; B01L 2300/0681; B01D 53/74; F24F 3/163; F24F 13/28; A47B 2037/005
See application file for complete search history.

(56) References Cited

U.S. PATENT DOCUMENTS

2025/0025880 A1* 1/2025 Lüdi .......................... E04B 9/02

FOREIGN PATENT DOCUMENTS

CN 204460504 U * 7/2015
CN 113559958 A 10/2021
EP 1340546 A2 * 9/2003 ................ B01L 9/02
(Continued)

OTHER PUBLICATIONS

English translation of CN204460504U dated Feb. 4, 2026 (Year: 2026).*
(Continued)

*Primary Examiner* — Michael G Hoang
*Assistant Examiner* — Brett P. Mallon
(74) *Attorney, Agent, or Firm* — Sughrue Mion, PLLC

(57) ABSTRACT

Disclosed is an experimentation table integrated with a harmful gas reduction and air purification system. More particularly, the experimentation table integrated with a harmful gas reduction and air purification system includes a medicine shelf installed above a workbench; pillar parts formed on opposite sides of the workbench to support the medicine shelf; and an air purification system that ensures that harmful gases generated from the workbench are discharged through a lower space of the chemical shelf and inner spaces of the pillars, wherein the air purification system includes an intake grill formed using a lower space of the medicine shelf; an intake duct installed to communicate with an intake grill using inner spaces of the pillar parts; and a dust collection device installed in a lower space of the workbench and connected to the intake duct.

8 Claims, 11 Drawing Sheets

(56) References Cited

FOREIGN PATENT DOCUMENTS

| | | | | | |
|---|---|---|---|---|---|
| KR | 100956016 | B1 | * | 5/2010 | ................ B01L 9/02 |
| KR | 101410430 | B1 | * | 6/2014 | ............. A47B 37/00 |
| KR | 10-2017-0040916 | A | | 4/2017 | |
| KR | 10-2017-0099559 | A | | 9/2017 | |
| KR | 101809207 | B1 | * | 12/2017 | ................ B01L 9/02 |
| KR | 10-2541049 | B1 | | 6/2023 | |
| KR | 20230123807 | A | * | 8/2023 | ............. B01D 46/12 |
| WO | WO-2023094687 | A1 | * | 6/2023 | ................ F24F 7/08 |

OTHER PUBLICATIONS

English translation of EP1340546A2 dated Feb. 4, 2026 (Year: 2026).*
English translation of KR100956016B1 dated Feb. 4, 2026 (Year: 2026).*
English translation of KR101410430B1 dated Feb. 4, 2026 (Year: 2026).*
English translation of KR101809207B1 dated Feb. 4, 2026 (Year: 2026).*
English translation of KR20230123807A dated Feb. 4, 2026 (Year: 2026).*
Korean Office Action dated Dec. 4, 2025, issued in Korean application No. 10-2023-0144983.

* cited by examiner

【FIG. 1】
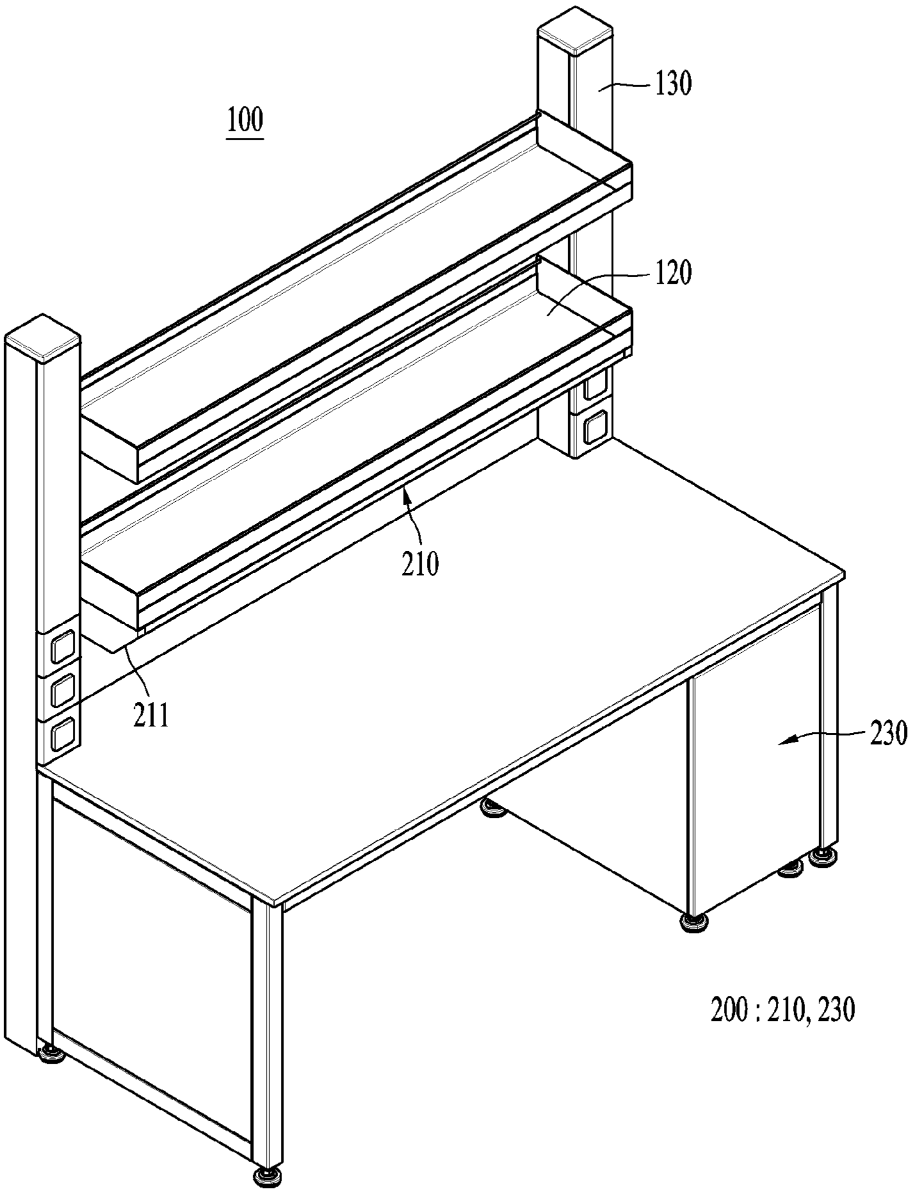

【FIG. 2】
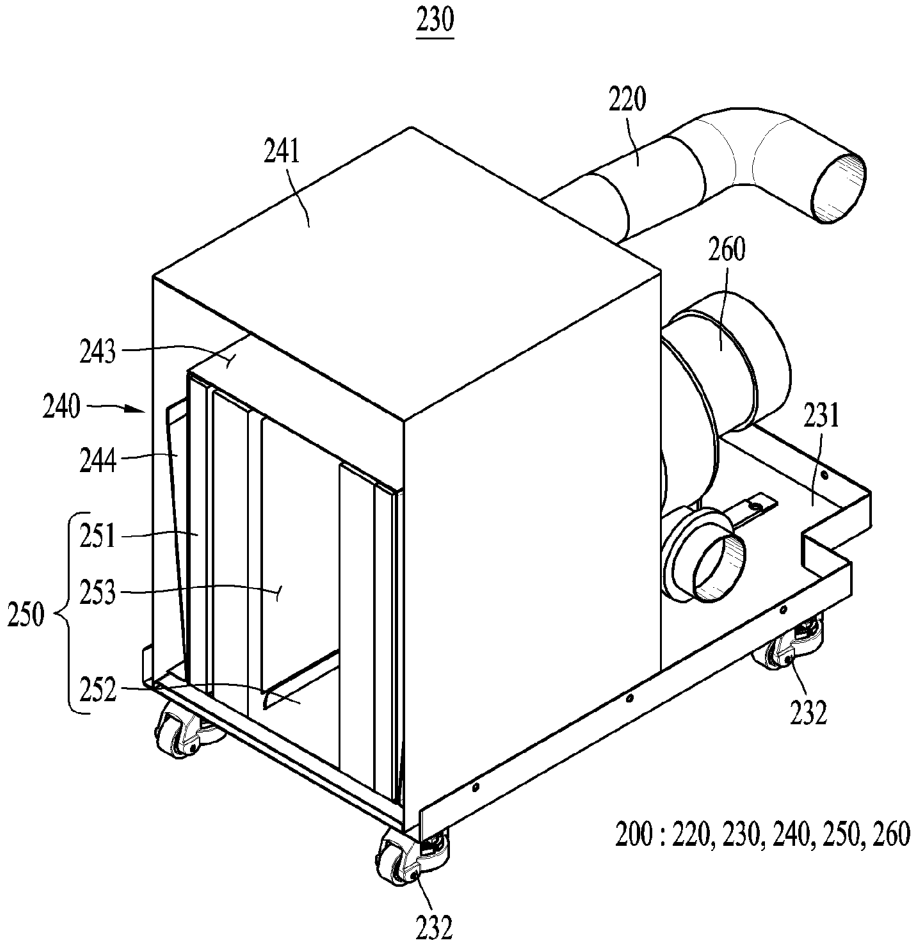

【FIG. 3】
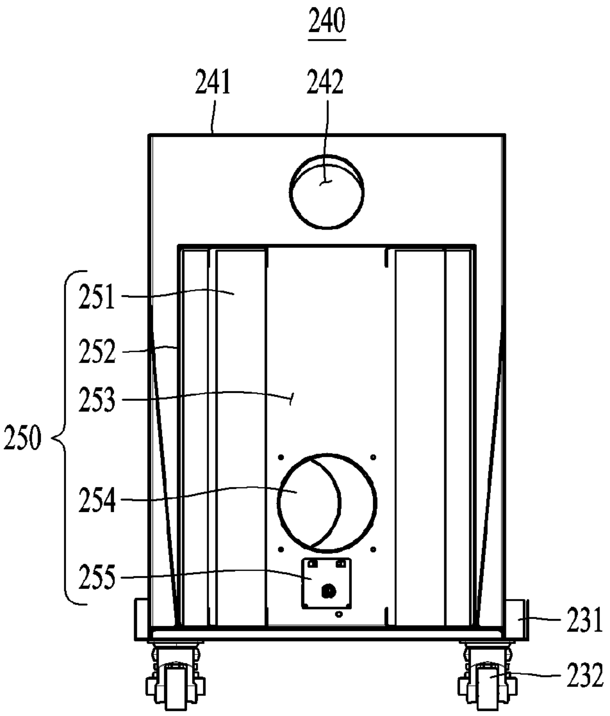
【FIG. 4】
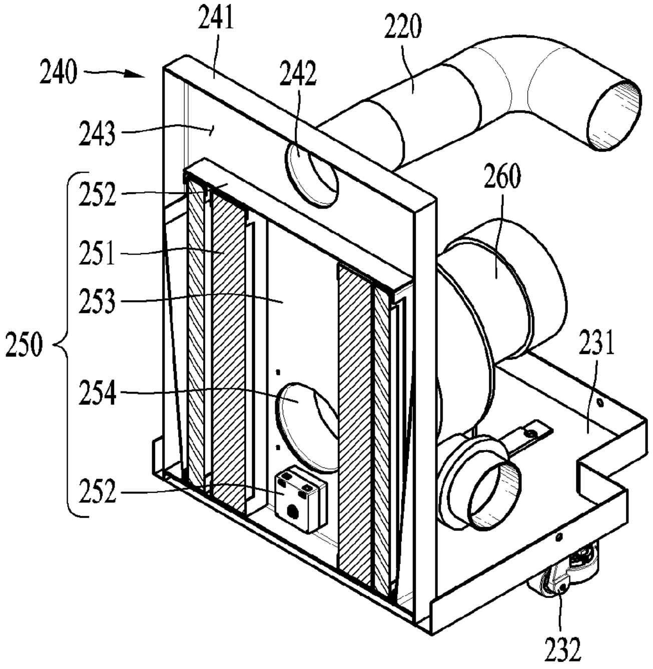

【FIG. 5】
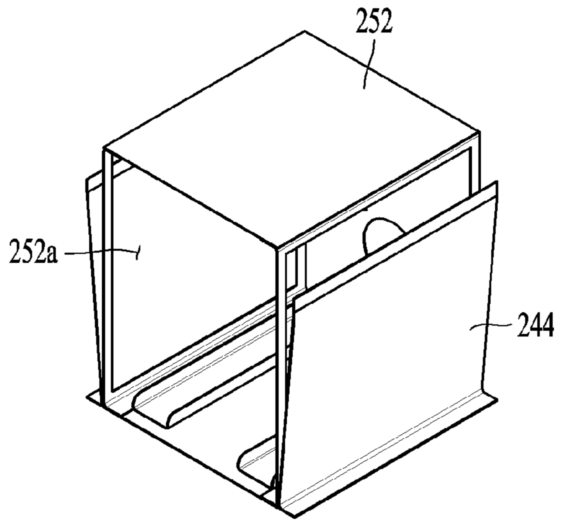

【FIG. 6】
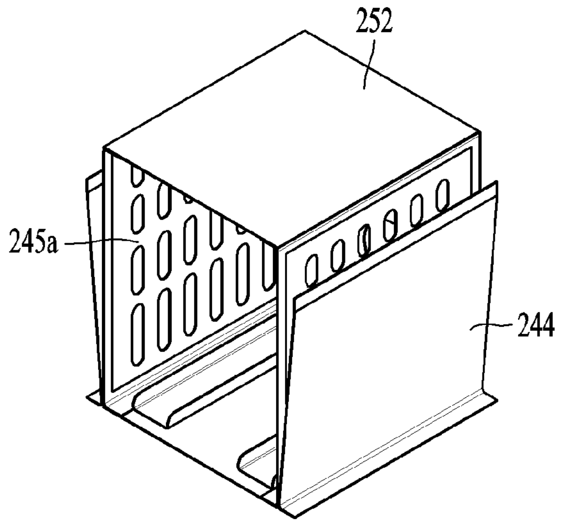
245a
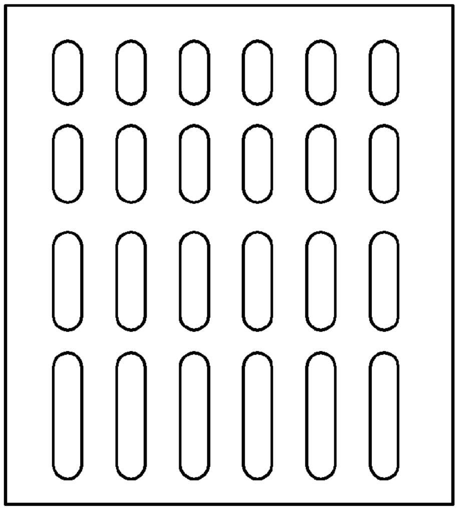

【FIG. 7】
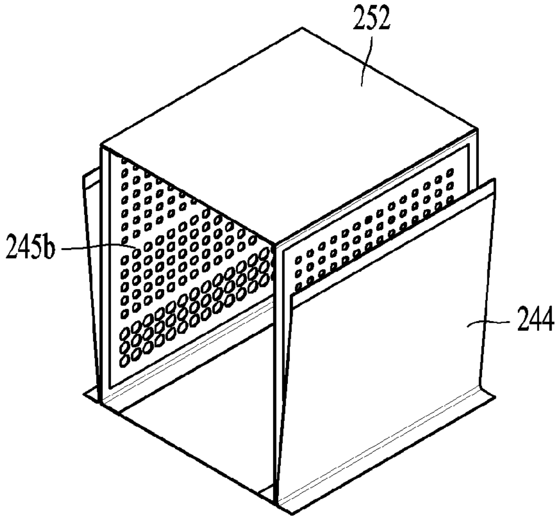
245b
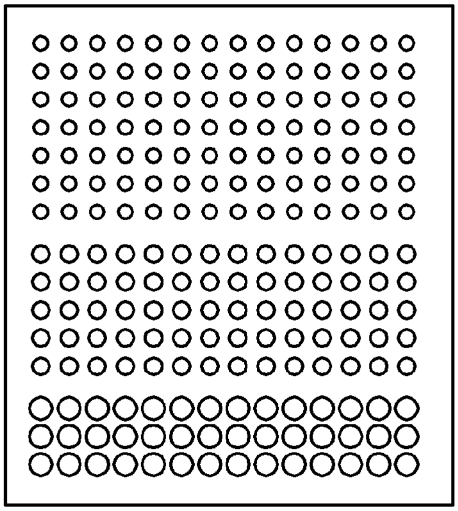

【FIG. 8】
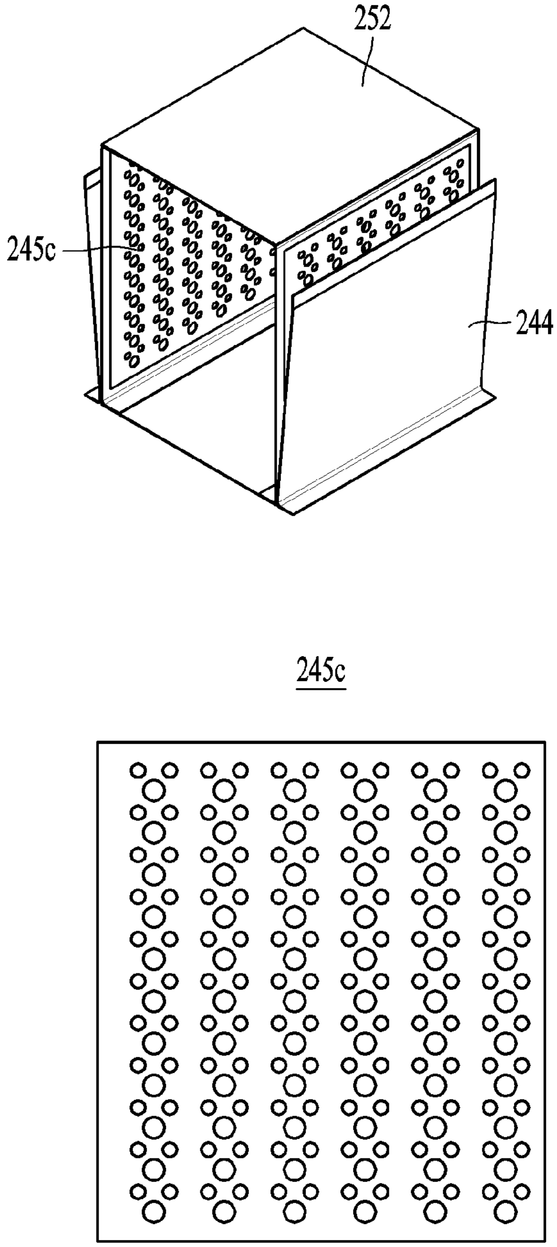

【FIG. 9】
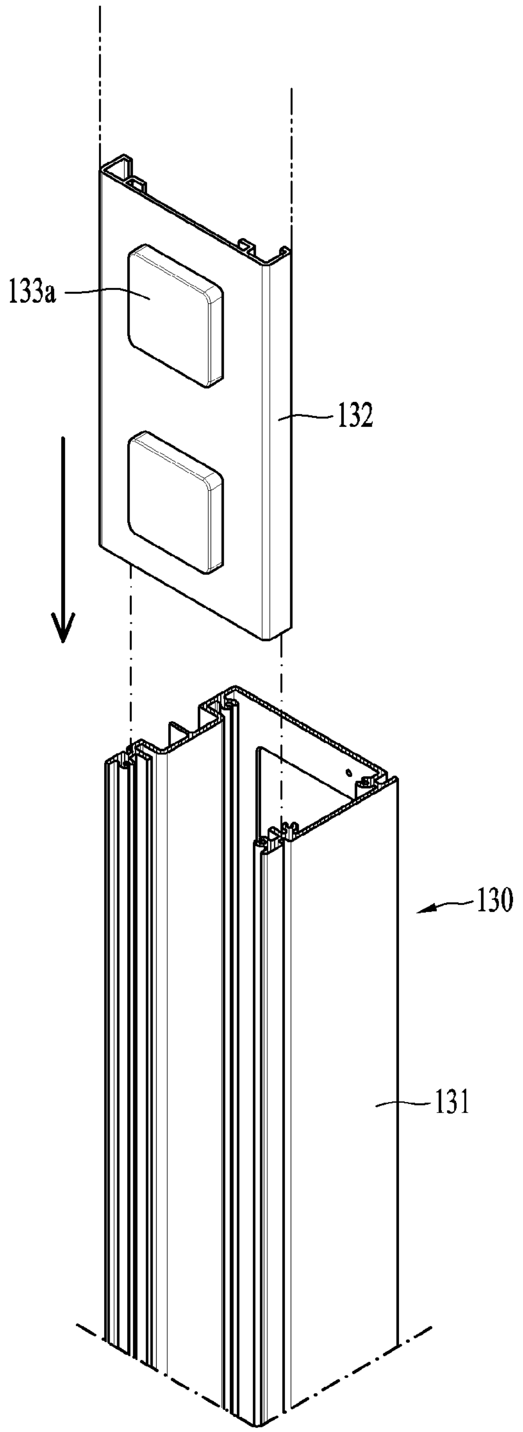

【FIG. 10】
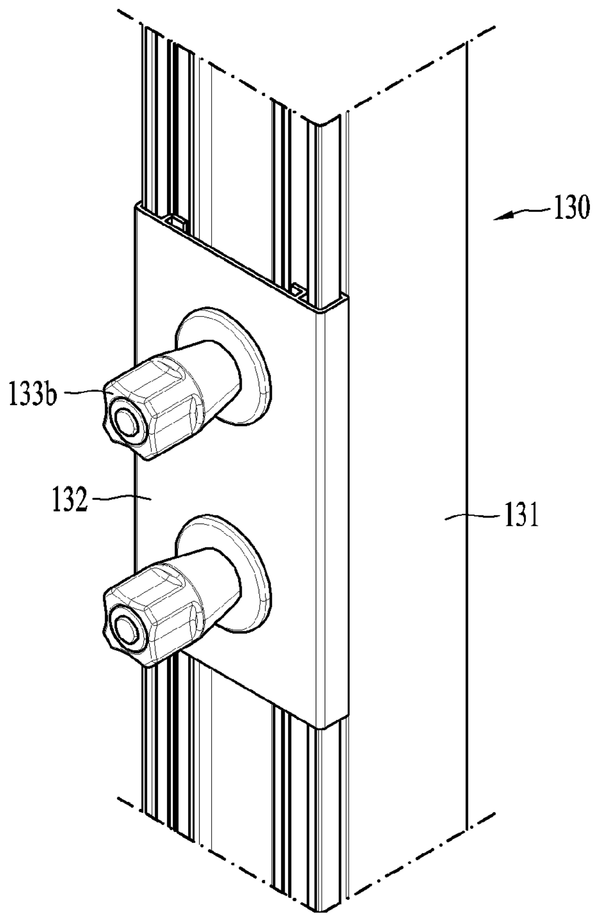

【FIG. 11】
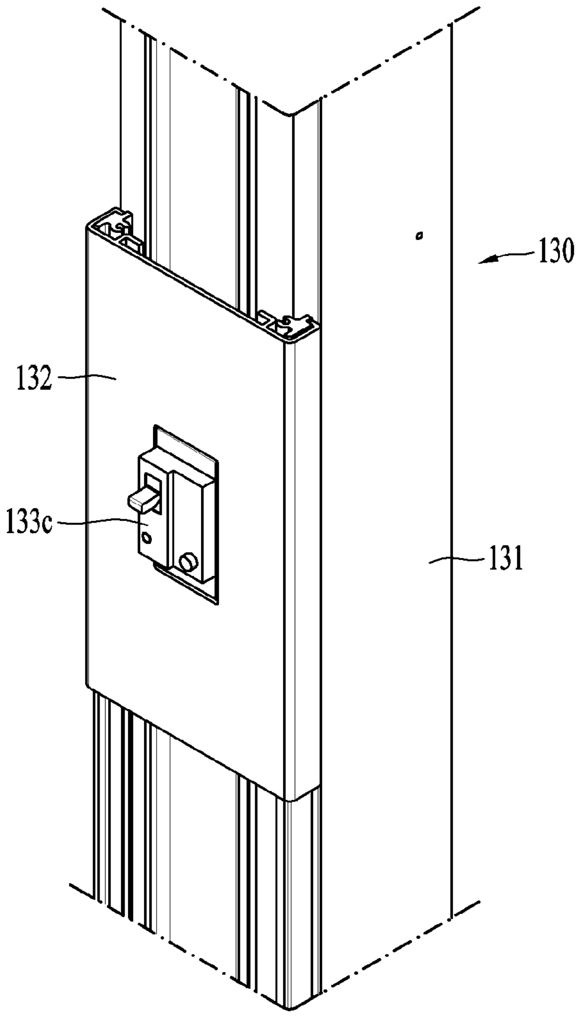

【FIG. 12】
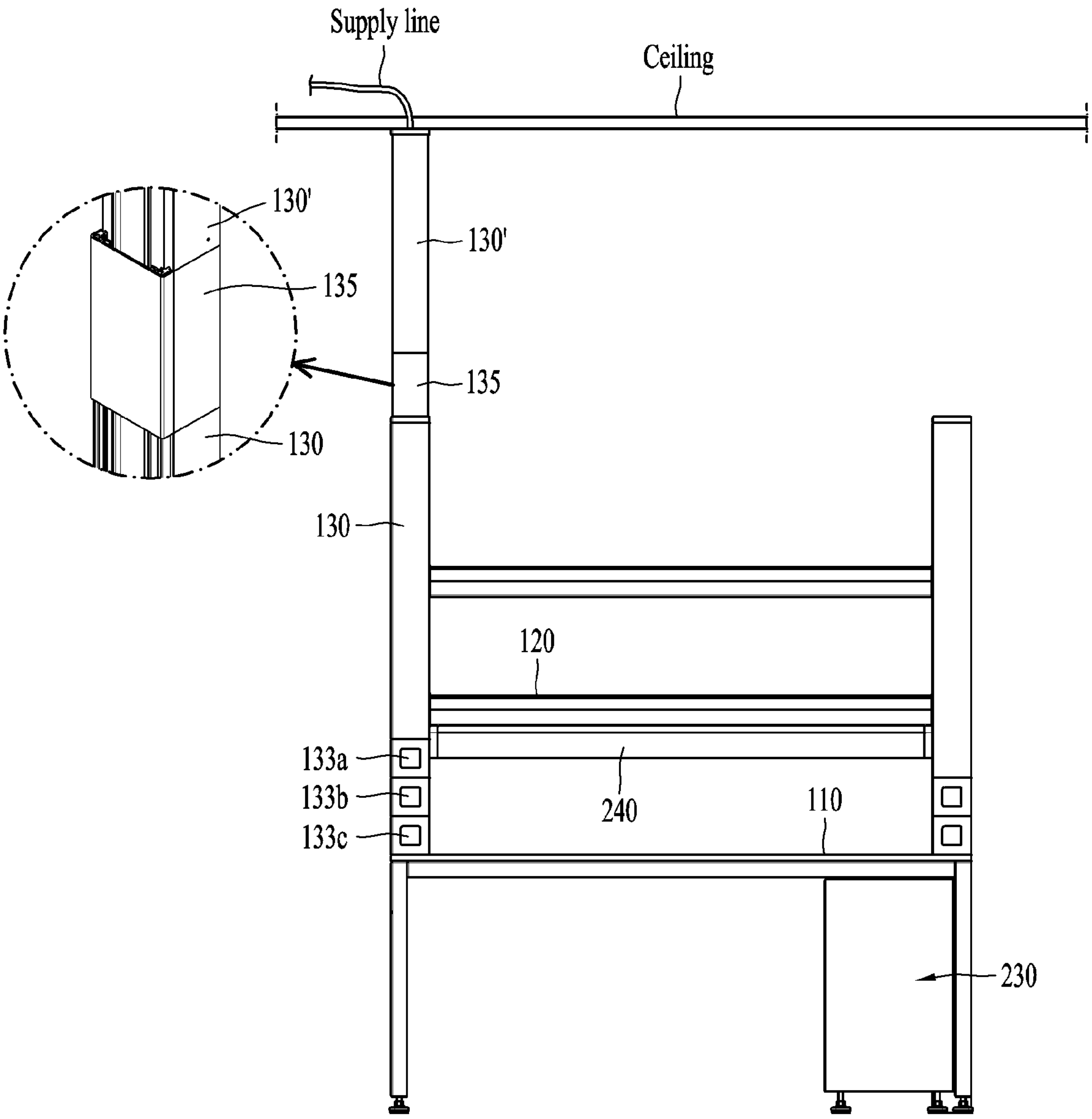

EXPERIMENTATION TABLE INTEGRATED WITH HARMFUL GAS REDUCTION AND AIR PURIFICATION SYSTEM

CROSS-REFERENCE TO RELATED APPLICATION

This application claims priority to Korean Patent Application No. 10-2023-0144983, filed on Oct. 26, 2023 in the Korean Intellectual Property Office, the disclosure of which is incorporated herein by reference.

BACKGROUND OF THE DISCLOSURE

Field of the Disclosure

The present disclosure relates to an experimentation table integrated with a harmful gas reduction and air purification system, and more particularly to an experimentation table integrated with a harmful gas reduction and air purification system capable of discharging harmful gases generated from a workbench through a lower space of a chemical shelf of the table and an inner space of a pillar thereof.

Description of the Related Art

Generally, a laboratory table used in a laboratory or an experimental room is provided with a basic table for performing chemical experiments using various chemicals and a shelf space where reagents required for an experiment can be placed. Since various experimental equipment is placed on a laboratory table during the experiment, it is equipped with an upper plate with a larger area than a typical study or office desk.

Accordingly, existing laboratory tables are generally composed of a table frame forming a basic frame, side plates supporting both sides of the table frame, and an upper plate installed on the top of the table frame.

All experiments require various reagents. Among the various reagents required for experiments, reagents that generate harmful gases are stored separately by installing a closed reagent storage device which is a separate, expensive storage device, and a structure for filtering and exhausting pollutants is installed. However, considering the limitations of laboratory space and the movement of an experimenter to a storage device to move reagents needed for each experiment, there has been inefficiency and inconvenience in time utilization.

Accordingly, for convenience of management, reagents needed for general experiments are displayed and stored on a shelf above a laboratory table after experiments, which is inconvenient in that odors are generated there.

Meanwhile, in laboratories with multiple laboratory tables, a fume hood is usually installed to exhaust harmful gases and cross-contamination gases, which may be generated during experiments, through ducts installed outside the laboratory. An exhaust device to generate power is often installed to exhaust harmful gases and cross-contamination gases generated in a limited, partially enclosed space to the outside through a fume hood.

However, such a duct-type fume hood is not equipped with an exhaust device, but the exhaust device is installed to exhaust harmful gases from the limited space of a hood. Accordingly, even when the generation of harmful gases and cross-contamination gases is small or an experiment is conducted only on some of laboratory tables, harmful gases must be discharged throughout the entire laboratory, so there are frequent cases where the experiment is just performed due to the inconvenience of operating a fume hood.

Accordingly, Korean Patent No. 10-0956016 has proposed a simple laboratory table for conducting low-risk experiments equipped with an individual exhaust device that can quickly discharge harmful substances generated during experiments.

However, as this technology has a limitation in that the suction power of harmful gases and cross-contamination gases is concentrated on the front of an experimentation table and the suction power does not reach both sides of the experimentation table, there is a problem with harmful gases and cross-contamination gases remaining on both sides of an experimentation table, especially in the corners, which threatens the health of an experimenter.

In addition, the technology has the problem of polluting the atmospheric environment as hazardous substances are discharged in an unpurified state.

RELATED ART DOCUMENT

Patent Document (Patent Document 0001) Korean Patent No. 10-0956016

SUMMARY OF THE DISCLOSURE

Therefore, the present disclosure has been made in view of the above problems, and it is an object of the present disclosure to provide an experimentation table integrated with a harmful gas reduction and air purification system capable of discharging harmful gases generated from a workbench through a lower space of a chemical shelf and an inner space of a pillar.

It is another object of the present disclosure to provide an experimentation table integrated with a harmful gas reduction and air purification system which has a simple appearance, can provide a comfortable environment, and has excellent space utilization because an air purification system is not exposed to the outside.

It is still another object of the present disclosure to provide an experimentation table integrated with a harmful gas reduction and air purification system wherein a dust collection device can be placed in the form of a drawer at the bottom of a workbench, and when necessary, the dust collection device can be separated from an intake duct and moved, so an arrangement structure can be freely changed and it is convenient to use and manage.

It is still another object of the present disclosure to provide an experimentation table integrated with a harmful gas reduction and air purification system which can improve suction efficiency by installing a fluid guide plate that forms an outward slope between the left and right walls of a filter box and a filter module to guide suction fluid (harmful gases) to concentrate on a filter module.

It is still another object of the present disclosure to provide an experimentation table integrated with a harmful gas reduction and air purification system which has a grill surface, which extends along the transverse direction of a workbench, provided to form an inclined surface from the upper rear side of the workbench toward the lower front side of the workbench, thereby being capable of suctioning and removing harmful gases and cross-contamination substances from a wide area.

It is yet another object of the present disclosure to provide an experimentation table integrated with a harmful gas reduction and air purification system wherein various utilities, including electrical outlets, chemicals/gases, and water piping, are arranged in vertical lines on the pillars of a profile structure, so the appearance of the experimentation table can be configured simply, the risk of contact with harmful gases and cross-contamination gases generated during work can be avoided, and the utility usability of workers can be improved.

In accordance with an aspect of the present invention, the above and other objects can be accomplished by an experimentation table integrated with a harmful gas reduction and air purification system, the experimentation table including: a medicine shelf installed above a workbench; pillar parts formed on opposite sides of the workbench to support the medicine shelf; and an air purification system that ensures that harmful gases generated from the workbench are discharged through a lower space of the chemical shelf and inner spaces of the pillars, wherein the air purification system includes an intake grill formed using a lower space of the medicine shelf; an intake duct installed to communicate with an intake grill using inner spaces of the pillar parts; and a dust collection device installed in a lower space of the workbench and connected to the intake duct.

In addition, the intake grill may form an inclined surface such that a grill surface extending along a transverse direction of the workbench faces from a rear upper side of the workbench to a front lower side thereof.

In addition, the dust collection device may be moved in a state of being separated from the intake duct by installing a moving caster at a bottom of a device case.

In addition, the dust collection device may include: a purification part installed inside the device case to be connected to the intake duct, thereby filtering out harmful gases; and an exhaust fan installed on an exhaust side of the purification part.

In addition, the dust collection device may include: a purification part installed inside the device case to be connected to the intake duct, thereby filtering out harmful gases; and an exhaust fan installed on an exhaust side of the purification part.

In addition, the purification part may include: a filter box having a closed space thereinside; an intake port formed on an upper side of the filter box to be connected to the intake duct; and a filter module installed to be spaced apart by a certain distance from left and right side walls and upper wall of the filter box, wherein fluid guide plates forming an inclined surface in an outward direction are formed between each of left and right walls of the filter box and the filter module such that a suction fluid, distributed to left and right through a distribution passage at an upper part of the filter box is collected on sides of the filter module.

In addition, the filter module may include: multi-filters including a pre-filter, a carbon filter, and a HEPA filter; a filter housing on both left and right sides of which the multi-filters are symmetrically arranged and which secures a back pressure-forming part of a certain space by placing the multi-filters on opposite sides to be space apart from each other; and an exhaust port formed to communicate with an exhaust fan on a lower side of the back pressure-forming part.

In addition, a plasma module of generating negative ions may be installed on one side of the exhaust port.

In addition, both left and right sides of the filter housing may be opened to form a suction fluid entry part.

In addition, a flow distribution plate may be installed at the suction fluid entry part.

In addition, each of the pillar parts may include a module frame having a hollow tube shape; and a frame cover detachably coupled to a rail on one side surface of the module frame.

In addition, utilities including an electric outlet, a faucet, a gas valve, an air valve, a cock, an LCD module panel, and a power ON/OFF switch may be installed using the frame cover of the pillar part.

In addition, a joint member may be connected to an upper part of the pillar part to extend a pillar extension up to a height of a ceil, and a hollow pipe of the pillar extension may be used to provide a supply line connected from the ceiling to various utilities.

BRIEF DESCRIPTION OF THE DRAWINGS

The above and other objects, features and other advantages of the present disclosure will be more clearly understood from the following detailed description taken in conjunction with the accompanying drawings, in which:

FIG. 1 is a perspective view illustrating an experimentation table integrated with a harmful gas reduction and air purification system according to the present disclosure;

FIG. 2 is a perspective view illustrating a dust collection device according to the present disclosure;

FIG. 3 is a front-sectional view illustrating the dust collection device according to the present disclosure;

FIG. 4 is a partial cut-out perspective view illustrating the dust collection device according to the present disclosure;

FIG. 5 illustrates an exemplary view of a fluid guide plate being installed in a filter housing according to the present disclosure;

FIGS. 6 to 8 illustrate exemplary views of a fluid guide plate and flow distribution plate being installed in the filter housing according to the present disclosure;

FIGS. 9 to 11 illustrate exemplary views of a pillar structure and utility installation according to the present disclosure; and FIG. 12 illustrates an exemplary view of a cable entry structure passing through a ceiling using a pillar extension structure according to the present disclosure.

DETAILED DESCRIPTION OF THE DISCLOSURE

Hereinafter, the present disclosure according to a preferred embodiment is described in detail with reference to the accompanying drawings. Here, the same symbols are used for the same components, and repetitive descriptions and detailed descriptions of known functions and configurations that may unnecessarily obscure the gist of the invention are omitted. Embodiments of the disclosure are provided to more fully explain the present disclosure to those of average skill in the art. Therefore, the shapes and sizes of elements in the drawings may be exaggerated for clearer explanation.

FIG. 1 is a perspective view illustrating an experimentation table integrated with a harmful gas reduction and air purification system according to the present disclosure, FIG. 2 is a perspective view illustrating a dust collection device according to the present disclosure, FIG. 3 is a front-sectional view illustrating the dust collection device according to the present disclosure, FIG. 4 is a partial cut-out perspective view illustrating the dust collection device according to the present disclosure, FIG. 5 illustrates an exemplary view of a fluid guide plate being installed in a filter housing according to the present disclosure, FIGS. 6 to 8 illustrate exemplary views of a fluid guide plate and flow distribution plate being installed in the filter housing according to the present disclosure, FIGS. 9 to 11 illustrate exemplary views of a pillar structure and utility installation according to the present disclosure, and FIG. 12 illustrates an exemplary view of a cable entry structure passing through a ceiling using a pillar extension structure according to the present disclosure.

Referring to FIG. 1, an experimentation table 100 according to the present disclosure may include a medicine shelf 120 installed above a workbench 110, pillar parts 130 formed on opposite sides of the workbench 110 to support the medicine shelf 120, and an air purification system 200 allowing harmful gases generated from the workbench 110 to be discharged from a lower space of the medicine shelf 120 and an inner space of the pillar parts 130.

According to the present disclosure, harmful gases generated from the workbench 110 are discharged from a lower space of the medicine shelf 120 and an inner space of the pillar parts 130, so there is an advantage of not having to have a separate purification facility, which greatly contributes to cost reduction.

In addition, the present disclosure is to prevent the air purification system from being revealed to the outside, so the experimentation table 100 has a simple appearance, can provide a pleasant environment and provides excellent space utilization.

FIG. 2 is a perspective view illustrating a dust collection device according to the present disclosure, FIG. 3 is a front-sectional view illustrating the dust collection device according to the present disclosure, and FIG. 4 is a partial cut-out perspective view illustrating the dust collection device according to the present disclosure.

Referring to FIGS. 2 to 4, an air purification system 200 according to the present disclosure may include an intake grill 210; an intake duct 220; and a dust collection device 230.

The intake grill 210 may be formed using a lower space of the medicine shelf 120. The intake grill 210 may an inclined surface such that the grill surface 211 extending along a transverse direction of the workbench 110 is directed from a rear upper side of the workbench 110 to a front lower side thereof.

Such a structure of the intake grill 210 allows for the suction and removal of harmful gases and cross-contaminants over a large area above the workbench.

The intake duct 220 may be installed to communicate with the intake grill 210 using the inner space of the pillar parts 130. The intake duct 220 may have an external appearance such as a cylindrical tube body (see FIGS. 2 to 4).

The dust collection device 230 may be installed in the lower space of the workbench 110 and connected to the intake duct 220.

In the present disclosure, the dust collection device 230 may be placed in the form of a drawer at a lower part of the workbench 110, and when necessary, it may be separated from the intake duct 220 and moved, so the arrangement structure can be freely changed, making it convenient to use and manage.

Hereinafter, the dust collection device 230 is described in more detail.

The dust collection device 230 may be moved in a state of being separated from the intake duct 220 by installing a moving caster 232 at a lower part of a device case 231. Here, the moving caster 232 may include a position-fixing means.

The dust collection device 230 may include a purification part 240; and an exhaust fan 260.

The purification part 240 may be installed inside the device case 231 to be connected to the intake duct 220, thereby providing a construction of filtering harmful gases.

The exhaust fan 260 may be installed on an exhaust side of the purification part 240 to discharge purified air to the outside.

The purification part 240 may include a filter box 241; an intake port 242; and a filter module 250.

The filter box 241 may be provided in the form of a hexahedron forming a closed space inside, and the intake port 242 is formed to be connected to the intake duct 220 on the filter box 241.

In addition, the filter module 250 is installed to be spaced apart from the left and right side walls and upper wall of the filter box 241 at a certain distance. Here, a suction fluid distributed to the left and right through a distribution passage 243 at an upper part of the filter box 241 may be collected on sides of the filter module 250 by installing a fluid guide plate 244, which forms an inclined surface in the outward direction, between each of the left and right sides of the filter box 241 and the filter module 250.

A suction fluid (harmful gases) is guided to be concentrated in the filter module 250 by installing the fluid guide plate 244 in a such manner, so that suction efficiency may be improved and the purification efficiency of polluted air may be increased.

The filter module 250 may include a multi-filter 251; a filter housing 252; and an exhaust port 254.

The multi-filter 251 may be provided in a module form consisting of multiple filters including a pre-filter, a carbon filter, and a HEPA filter.

The filter housing 252 may serve as a structure to secure a back pressure-forming part 253 of a certain space by symmetrically installing the multi-filters 251 on opposite left and right sides thereof and spacing apart the multi-filters 251 from each other.

Here, the back pressure-forming part 253 prevents a suction fluid passing through the multi-filter 251 from being concentrated towards the exhaust port 254, thereby providing a vacuum space so that a constant pressure is formed in the entire space.

The filter housing 252 on the lower side of the back pressure-forming part 253 may include the exhaust port 254 formed to communicate with the exhaust fan 260.

In addition, a plasma module 255 that generates negative ions may be installed on one side of the exhaust port 254. Here, the plasma module 255 performs secondary air purification of air, primarily purified from harmful gases and cross-contamination substances through the multi-filter 251, according to a pulse used in a synchronization method of a negative ion generator. Here, the air secondary purified by the plasma module 255 may purify 85% to 99.9% of *E. coli, Staphylococcus aureus*, and pneumonia bacteria.

FIG. 5 is an exemplary view illustrating a fluid guide plate installed in a filter housing according to the present disclosure, and particularly an embodiment of forming a suction fluid entry part 252*a* by opening both left and right sides of the filter housing 252.

FIGS. 6 to 8 illustrate exemplary views of a fluid guide plate and flow distribution plate installed in a filter housing according to the present disclosure. Particularly, flow distribution plates 245*a*, 245*b* and 245*c* installed at the suction fluid entry part 252*a* may be manufactured in a variety of different hole shapes and hole sizes as shown in FIGS. 6, 7 and 8. The shapes illustrated in the accompanying drawings are only examples and various hole shapes and sizes are possible.

However, in the case of the flow distribution plates 245*a*, 245*b* and 245, the size of holes placed in an upper part where the flow speed is relatively high is made small to allow small and light particles to pass, and the size of holes placed in a lower part where the flow speed is relatively slow is made large to allow large and heavy particles to pass, thereby improving the purification ability by the multi-filter 251 by controlling an internal flow rate and fluid flow.

FIGS. 9 to 11 are exemplary views illustrating a pillar structure and utility installation according to the present disclosure.

Referring to FIGS. 9 to 11, the pillar parts 130 may include a module frame 131 having a hollow tube shape; and a frame cover 132 detachably coupled to a rail on the module frame 131.

Here, the module frame 131 may be provided as a profile structure in which one of the four sides is open. In addition, a rail structure is formed at opposite ends of the opening to guide rail combination with the frame cover 132.

In addition, various utilities 133*a*, 133*b* and 133*c* including electric outlets, faucets, gas valves, air valves, cocks, LCD module panels, and power ON/OFF switches may be installed using the frame cover 132 of the parts 130.

By arranging these various utilities (133*a*, 133*b*, 133*c*) in vertical lines on the pillar parts 130 of the profile structure, the appearance of the experimentation table may be configured simply, harmful gases and cross-contamination gases generated during work may be eliminated, the risk of contact with harmful gases and cross-contamination gases generated during work may be avoided, and work efficiency may be improved by improving the utility usability of workers.

The utilities installed on the frame cover 132 may be freely changed depending on the field of use, and assembly may be improved through a slide combination with the module frame 131, allowing for easy attachment and detachment, thereby increasing user convenience.

FIG. 12 illustrates an exemplary view of a cable entry structure passing through a ceiling using a pillar extension structure according to the present disclosure.

Referring to FIG. 12, a pillar extension 130 may be extended to a ceiling height by connecting a joint member 135 to an upper part of a pillar part 130, and a hollow pipe of the pillar extension 130 may be used to provide a supply line from the ceiling to various utilities 133*a*, 133*b* and 133*c*.

The length of the pillar extension 130 may be cut to suit spaces with different internal heights, such as offices, research institutes, and laboratories.

Here, a supply line includes all utilities including 220V power lines and chemical utilities such as gas pipes, air pipes, and water pipes. The supply line is a structure that comes down from a ceiling, and the organization of utilities can be simplified by forming a line inside the module frame 131 to connect to various utilities. In addition, as the supply line is installed inside a module frame where the power source and various pipes below the table come down to the ceiling, it is possible to avoid safety accidents such as electric shorts due to contact with moisture.

In addition, since there is no need to install piping at the bottom of the workbench, there is no interference with the movement of workers and a safe laboratory environment can be established.

As apparent above, the present disclosure provides an air purification system allowing harmful gases generated from a workbench to be discharged through a lower space of a chemical shelf and an inner space of a pillar. Accordingly, there is a cost-saving effect because there is no need to install a separate purification facility, a simple appearance and comfortable environment can be provided because the air purification system is not exposed to the outside, and space utilization is excellent.

In addition, a dust collection device can be placed in the form of a drawer at the bottom of a workbench, and when necessary, the dust collection device can be separated from an intake duct and moved, so an arrangement structure can be freely changed and it is convenient to use and manage.

In addition, the present disclosure can improve suction efficiency by installing a fluid guide plate that forms an outward slope between the left and right walls of a filter box and a filter module to guide suction fluid (harmful gases) to concentrate on a filter module, and can improve the purification efficiency of polluted air.

In addition, the present disclosure provides a grill surface, which extends along the transverse direction of a workbench, provided to form an inclined surface from the upper rear side of the workbench toward the lower front side of the workbench, thereby being capable of suctioning and removing harmful gases and cross-contamination substances from a wide area.

In addition, the present disclosure is characterized by arranging various utilities, including electrical outlets, chemicals/gases, and water piping, in vertical lines on the pillars of a profile structure, so the appearance of the experimentation table can be configured simply, the risk of contact with harmful gases and cross-contamination gases generated during work can be avoided, and the utility usability of workers can be improved, thereby improving work efficiency.

The present disclosure has been described with reference to an embodiment shown in the accompanying drawings, but this is merely illustrative, and those skilled in the art can understand that various modifications and other equivalent embodiments can be made therefrom. Therefore, the true scope of protection of the present disclosure will be determined solely by the scope of the appended claims.

[Description of Symbols]

| | |
|---|---|
| 100: experimentation table | 110: workbench |
| 120: medicine shelf | 130: pillar part |
| 130': pillar extension | 131: module frame |
| 132: frame cover | 133a, 133b, 133c: utility |
| 135: joint member | 200: air purification system |
| 210: intake grill | 211: grill surface |
| 220: intake duct | 230: dust collection device |
| 231: device case | 232: mobile caster |
| 240: purification part | 241: filter box |
| 242: intake port | 243: distribution passage |
| 244: fluid guide plate | 245a, 245b, 245c: flow distribution plate |
| 250: filter module | 251: multi-filter |
| 252: filter housing | 252a: suction fluid entry part |
| 253: back pressure-forming part | 254: exhaust port |
| 255: plasma module | 260: exhaust fan |

What is claimed is:

1. An experimentation table integrated with a harmful gas reduction and air purification system, the experimentation table comprising:

a medicine shelf installed above a workbench;

pillar parts formed on opposite sides of the workbench to support the medicine shelf, and an air purification system that ensures that harmful gases generated from the workbench are discharged through a lower space of the medicine shelf and inner spaces of the pillar parts, wherein the air purification system comprises;

an intake grill formed using a lower space of the medicine shelf;

an intake duct installed to communicate with the intake grill using inner spaces of the pillar parts; and a dust collection device installed in a lower space of the workbench and connected to the intake duct, wherein the dust collection device is configured to be moved in a state of being separated from the intake duct by a moving caster at a bottom of a device case, wherein the dust collection device comprises:

a purification part installed inside the device case to be connected to the intake duct, thereby filtering out harmful gases; and an exhaust fan installed on an exhaust side of the purification part, wherein the purification part comprises:

a filter box having a closed space thereinside;

an intake port formed on an upper side of the filter box to be connected to the intake duct; and a filter module installed to be spaced apart by a certain distance from a left side wall of the filter box, a right side wall of the filter box, and an upper wall of the filter box, wherein fluid guide plates forming an inclined surface in an outward direction are formed between each of left and right walls of the filter box and the filter module such that a suction fluid, distributed left and right through a distribution passage at an upper part of the filter box, is collected on sides of the filter module, wherein the intake port is formed at a side of the distribution passage, and a suction fluid introduced into the distribution passage through the intake port is divided and introduced between a left outer surface of the filter module and a left inner surface of the filter box and between a right outer surface of the filter module and a right inner surface of the filter box, wherein the fluid guide plates comprise:

a first fluid guide plate disposed between the left outer surface of the filter module and the left inner surface of the filter box; and a second fluid guide plate disposed between the right outer surface of the filter module and the right inner surface of the filter box, wherein the first fluid guide plate and the second fluid guide plate are arranged such that distances between the fluid guide plates and the left outer surface or the right outer surface of the filter module decrease toward a lower portion of the filter box, and wherein the filter module comprises:

multi-filters comprising a pre-filter, a carbon filter, and a HEPA filter;

a filter housing on both left and right sides of which the multi-filters are symmetrically arranged and which secures a back pressure-forming part of a certain space by placing the multi-filters on opposite sides to be spaced apart from each other; and an exhaust port formed to communicate with the exhaust fan on a lower side of the back pressure-forming part.

2. The experimentation table according to claim 1, wherein the intake grill forms an inclined surface such that a grill surface extending along a transverse direction of the workbench faces from a rear upper side of the workbench to a front lower side thereof.

3. The experimentation table according to claim 1, wherein a plasma module of generating negative ions is installed on one side of the exhaust port.

4. The experimentation table according to claim 1, wherein both left and right sides of the filter housing is opened to form a suction fluid entry part.

5. The experimentation table according to claim 4, wherein a flow distribution plate is installed at the suction fluid entry part.

6. The experimentation table according to claim 1, wherein each of the pillar parts comprises a module frame having a hollow tube shape; and a frame cover detachably coupled to a rail on one side surface of the module frame.

7. The experimentation table according to claim 6, wherein utilities comprising an electric outlet, a faucet, a gas valve, an air valve, a cock, an LCD module panel, and a power ON/OFF switch are installed using the frame cover of the pillar part.

8. The experimentation table according to claim 6, wherein a joint member is connected to an upper part of the pillar part to extend a pillar extension up to a height of a ceiling, and a hollow pipe of the pillar extension is used to provide a supply line connected from the ceiling to various utilities.

* * * * *